(12) United States Patent
Ye

(10) Patent No.: US 7,389,964 B2
(45) Date of Patent: Jun. 24, 2008

(54) SUPPORT FOR A COMPUTER PERIPHERAL DEVICE

(75) Inventor: Chao-Qin Ye, San Chong (TW)

(73) Assignee: Kye Systems Corp. (TW)

( * ) Notice: Subject to any disclaimer, the term of this patent is extended or adjusted under 35 U.S.C. 154(b) by 244 days.

(21) Appl. No.: 11/230,228

(22) Filed: Sep. 16, 2005

(65) Prior Publication Data

US 2007/0063115 A1 Mar. 22, 2007

(51) Int. Cl.
*E04G 5/06* (2006.01)
(52) U.S. Cl. .................. 248/231.61; 248/918; 348/373; 396/419
(58) Field of Classification Search .......... 248/231.61, 248/229.14, 229.12, 229.24, 229.22, 228.3, 248/228.5, 193.4, 230.3, 230.5, 231.41, 918, 248/311.2; 396/419, 428; 348/373, 376
See application file for complete search history.

(56) References Cited

U.S. PATENT DOCUMENTS

| | | | | |
|---|---|---|---|---|
| 5,320,444 A | * | 6/1994 | Bookwalter et al. | 403/323 |
| 5,555,302 A | * | 9/1996 | Wang | 379/446 |
| 5,836,563 A | * | 11/1998 | Hsin-Yung | 248/316.4 |
| 6,370,741 B1 | * | 4/2002 | Lu | 24/523 |
| 6,481,681 B1 | * | 11/2002 | Stunkel et al. | 248/231.31 |
| 6,663,066 B1 | | 12/2003 | Hong | |
| 6,679,463 B1 | | 1/2004 | Chen | |
| 6,731,340 B1 | * | 5/2004 | Lai | 348/373 |
| 6,845,954 B1 | | 1/2005 | Moayer et al. | |
| 6,880,791 B1 | * | 4/2005 | Lin | 348/231.61 |
| 7,093,811 B2 | * | 8/2006 | Wu | 248/229.12 |
| 7,203,903 B1 | * | 4/2007 | Thompson et al. | 348/373 |

* cited by examiner

*Primary Examiner*—Anita M. King
(74) *Attorney, Agent, or Firm*—Raymond Sun

(57) ABSTRACT

A support for a computer peripheral device has a base, a post having a first end extending through the base and a second end that couples a computer peripheral device, and a pair of base supports. Each base support has an extension which is received within the base and which engages the first end of the post. When the post is rotated, the base supports are separated from each other to define a clamping space therebetween.

17 Claims, 10 Drawing Sheets

SUPPORT FOR A COMPUTER PERIPHERAL DEVICE

BACKGROUND OF THE INVENTION

1. Field of the Invention

The present invention relates to a support for a computer peripheral device, and in particular, to a support for a computer peripheral device that can be positioned to stand by itself on a working surface or to clamp an object.

2. Description of the Prior Art

Computer peripheral devices are commonly used in many applications, such as for web cams, microphones, speakers, and security monitoring, among others. However, because a user's desk space is usually crowded and limited, it is important to provide supports for these peripherals that will help to conserve precious desk space.

SUMMARY OF THE DISCLOSURE

It is an object of the present invention to provide a steady clamping force for a computer peripheral device support.

It is another object of the present invention to provide a support for a computer peripheral device that is capable of either standing on a working surface or clamping on an object.

In order to accomplish the objects of the present invention, the present invention provides a support for a computer peripheral device. The support has a base, a post having a first end extending through the base and a second end that couples a computer peripheral device, and a pair of base supports. Each base support has an extension which is received within the base and which engages the first end of the post. When the post is rotated, the base supports are separated from each other to define a clamping space therebetween.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1 to 4B illustrate a support according to present invention, which includes a guiding base 11, a supporting post 12, and a pair of base supports 13 and 14. The base supports 13 and 14 can be moved towards, or away from, each other using the guide mechanisms described below.

Figure 1:
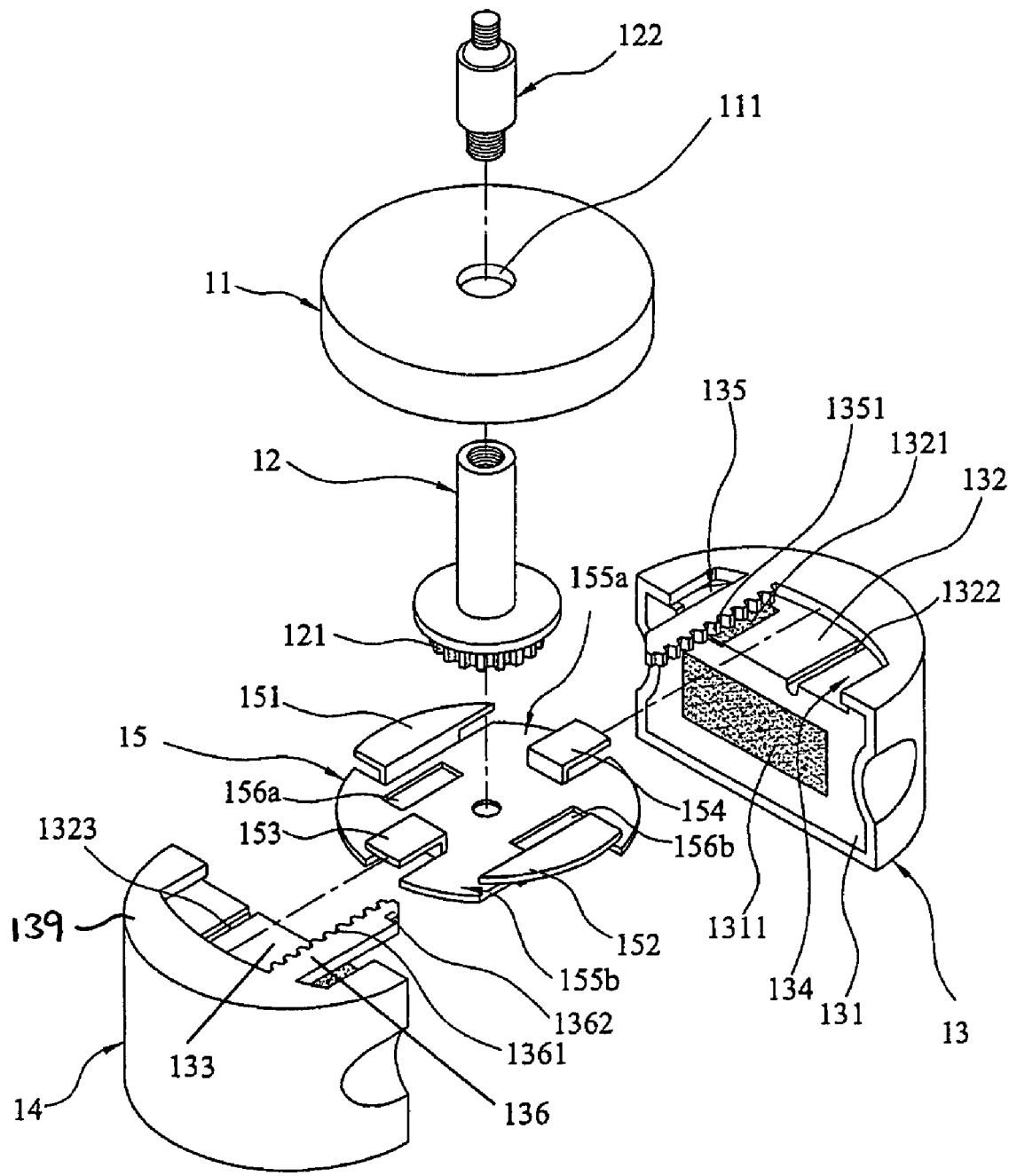
FIG. 1 is an exploded perspective view of a support according to the present invention.
Figure 2:
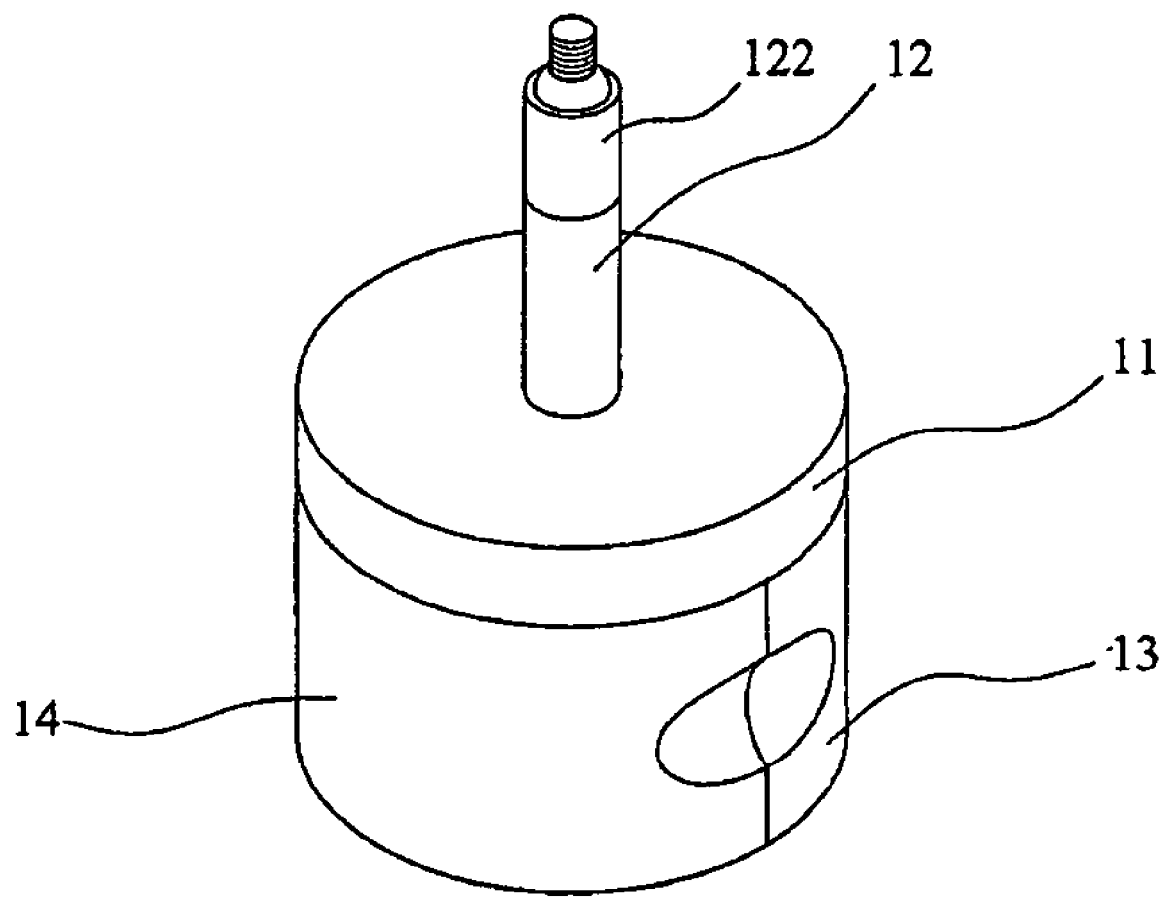
FIG. 2 is a perspective view of the support of FIG. 1.
Figure 3:
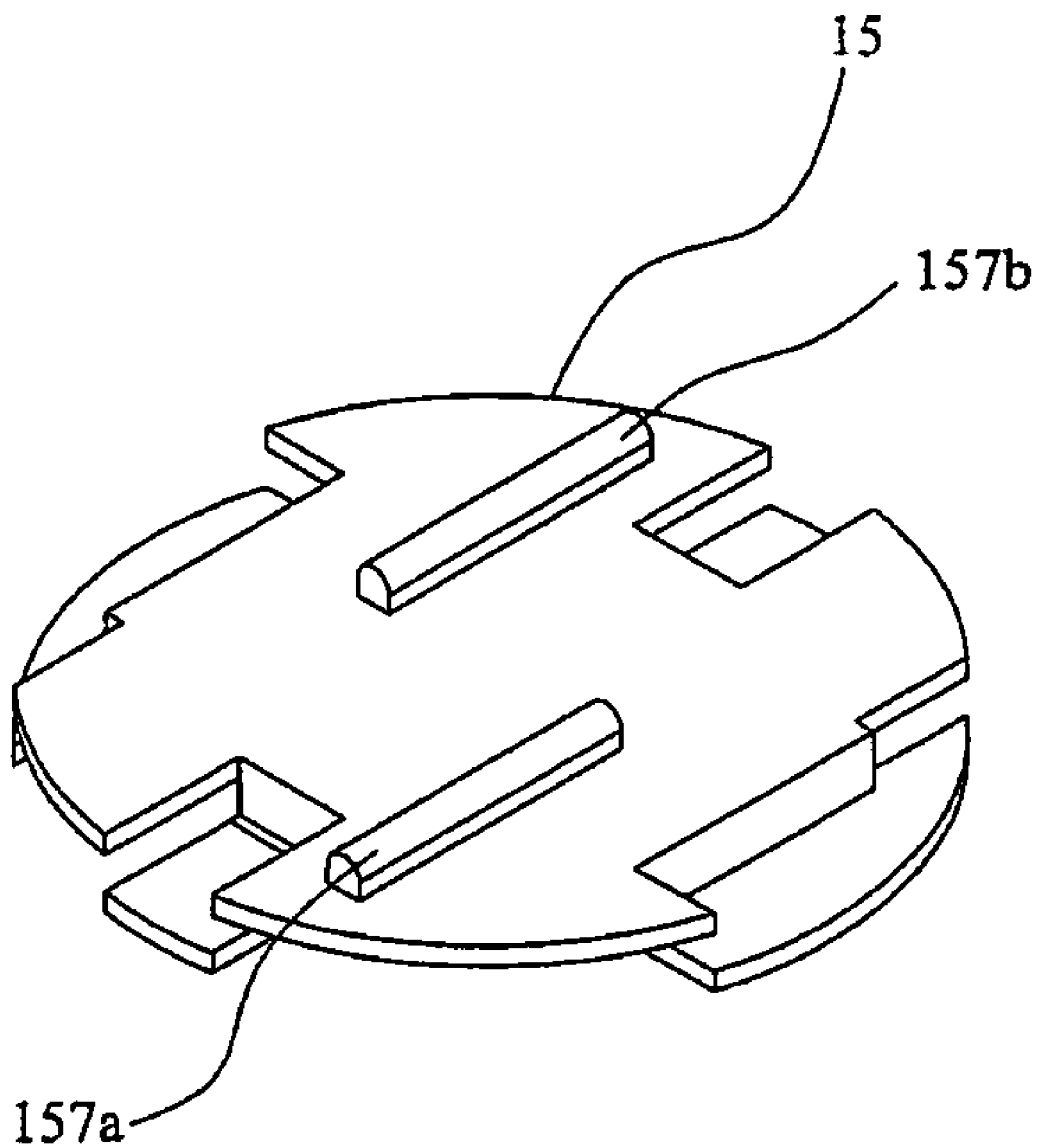
FIG. 3 is a bottom perspective view of a bottom plate of the support of FIG. 1.
Figure 4A:
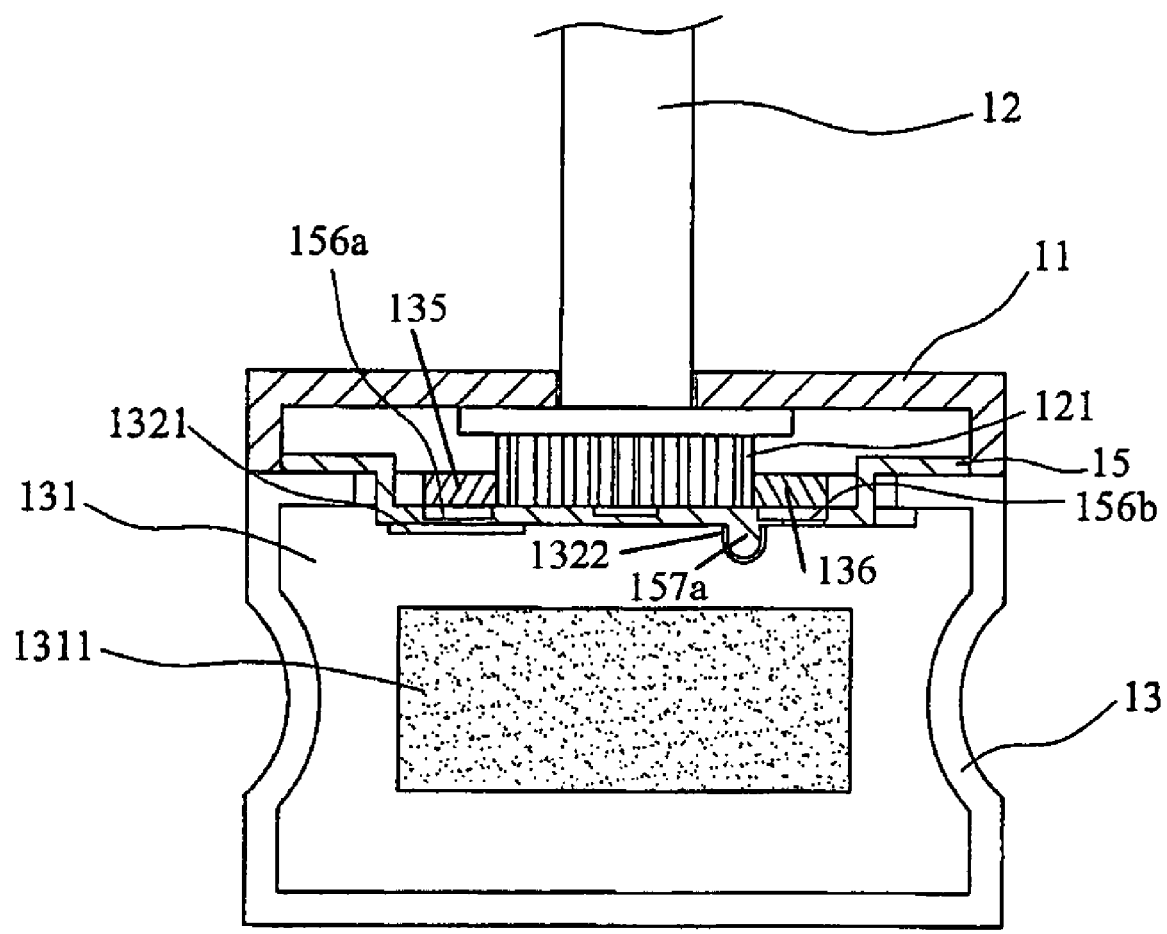
FIG. 4A is a cross-sectional view of the support of FIG. 1.
Figure 4B:
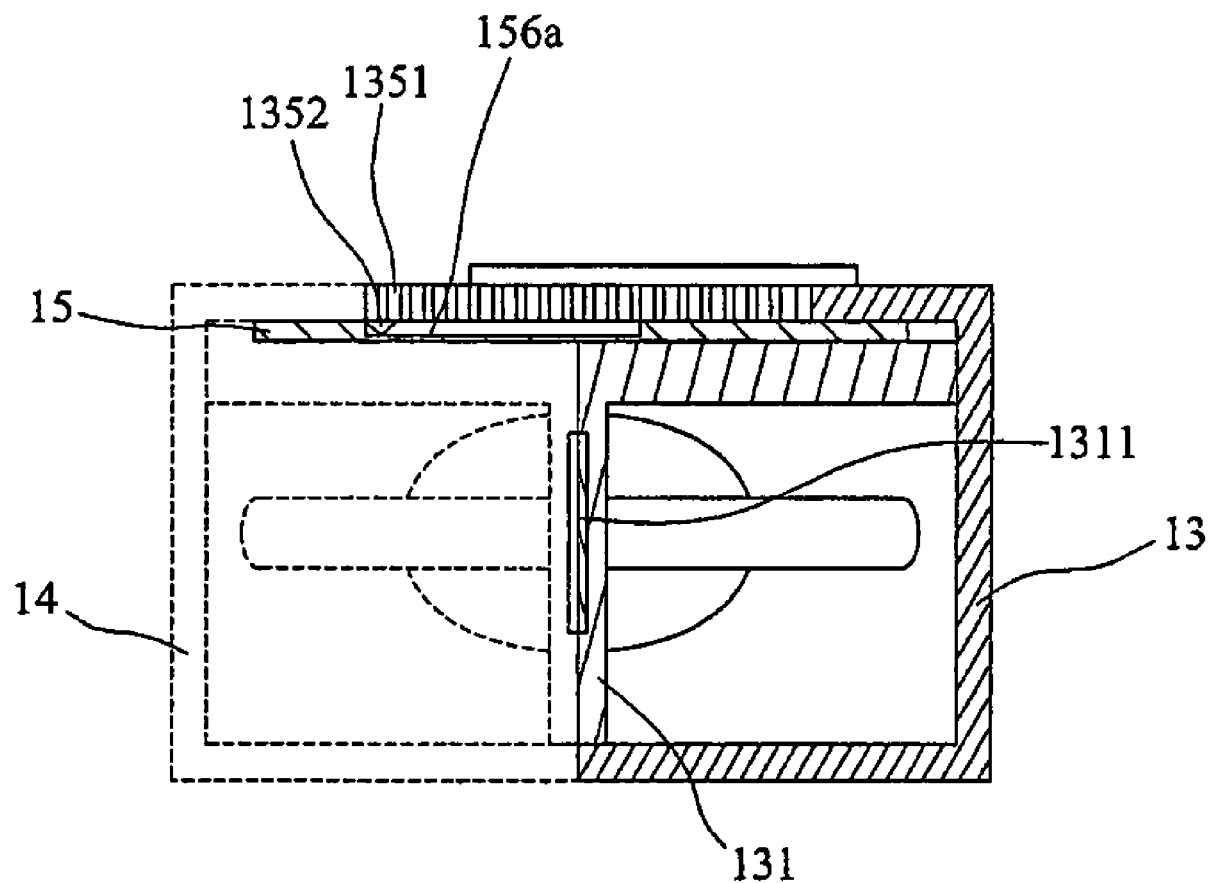
FIG. 4B is another cross-sectional view of the support of FIG. 1.

The base 11 has an opening 111. One end of the post 12 extends through the opening 111 and is coupled to a threaded ball joint 122, while the other end of the post 12 carries a gear wheel 121 that is retained inside the base 11. The base 11 has a bottom plate 15 which has wings 151, 152, 153, 154 positioned in spaced-apart manner on the upper surface of the bottom plate 15. In particular, the wings 151, 152, 153, 154 can be spaced apart from each other by about 45 degrees from each other, with each wing 151, 152, 153, 154 extending above and parallel to the plane of the bottom plate 15. Referring also to FIG. 3, guide elements in the form of ribs 157a, 157b can be provided on the bottom surface of the bottom plate 15.

Recesses 156a and 156b are provided on the bottom plate 15 adjacent the wings 151 and 152, respectively. A passage 155a is defined between the wings 151 and 154, and another passage 155b is defined between the wings 152 and 153. Now referring to FIGS. 1, 4A, 5B and 6B, each base support 13 and 14 has an extension 135 and 136, respectively, that extends through a corresponding passage 155a and 155b, respectively, to engage the gear wheel 121 via a plurality of teeth 1351 and 1361 provided on the extensions 135 and 136, respectively. Thus, the extensions 135 and 136 are adapted to always move in directions opposite to each other. For example, if the base supports 13 and 14 are moved towards each other (e.g., see FIGS. 5A and 5B), the extensions 135 and 136 will be moved towards the gearwheel 121, while if the base supports 13 and 14 are moved away from each other (e.g., see FIGS. 6A and 6B), the extensions 135 and 136 will be moved away from the gear wheel 121. The base supports 13 and 14 can be moved together or apart by rotating the post 12, which will in turn rotate the gear wheel 121.

Each base support 13 and 14 further has a groove 1322 and 1323, respectively, that function as guide elements for receiving a corresponding rib 157a and 157b from the base plate 15, with the ribs 157a and 157b adapted for reciprocal movement along the respective groove 1322 and 1323 as the extensions 135 and 136 move about the gear wheel 121. In addition, each extension 135 and 136 has a hook 1352 and 1362, respectively (see FIGS. 5B and 6B), that is received inside the corresponding recess 156a and 156b, respectively, for movement inside a moving space 134 which is defined by the space between the top surface 139 of the base supports 13, 14 and the recessed surfaces 132 and 133 of the base supports 13 and 14, respectively, as the extensions 135 and 136 move about the gear wheel 121.

Pads 1321 can be provided on the recessed surfaces 132, 133 for increasing the friction between the bottom plate 15 and the recessed surfaces 132, 133. In addition, pads 1311 can be oriented vertically on the inner face 131 of the base supports 13 and 14 to protect an object that is to be clamped between the base supports 13 and 14. These pads 1321 and 1311 can be provided in the form of a rubber-like material, or any similar material that can function to increase friction to grip an object while also being able to protect the surface of this object.

Figure 5A:
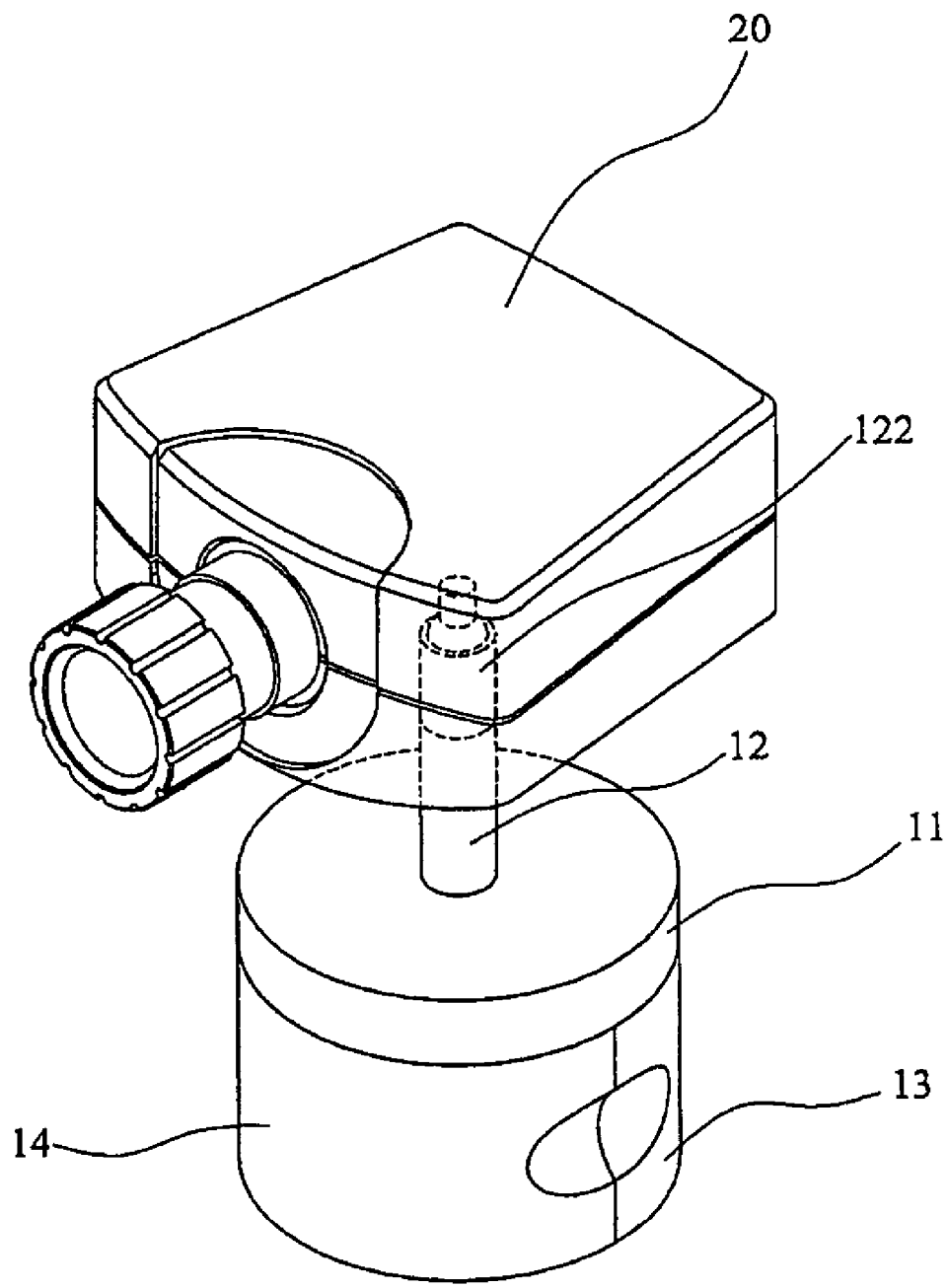
FIG. 5A is a perspective view of the support of FIG. 1 shown in use with a web cam in a standing position.
Figure 5B:
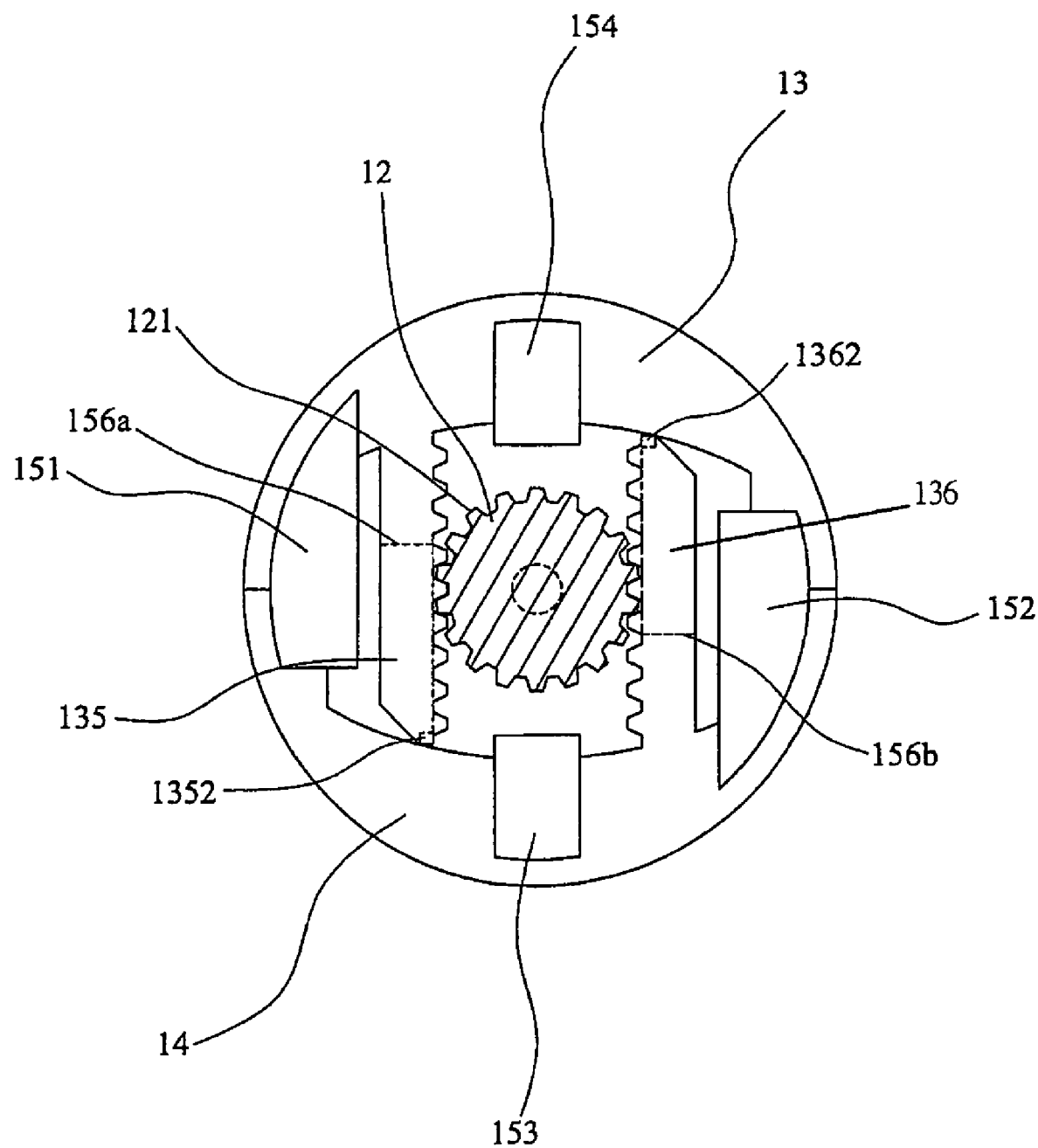
FIG. 5B is a simplified top plan view of the support when in the position shown in FIG. 5A.

FIGS. 5A–7 illustrate the various ways in which the support of the present invention can be used. Referring first to FIGS. 5A and 5B, the post 12 can be coupled to a web cam 20 via the ball joint 122 such that the web cam 20 can be positioned at an angled position. The base supports 13 and 14 can be moved together to form a closed standing position, in which the wings 151, 152, 153 and 154 are positioned on the top of the base supports 13 and 14. The extensions 135 and 136 are engaged with the gear wheel 121 at each side of the gear wheel 121.

Figure 6A:
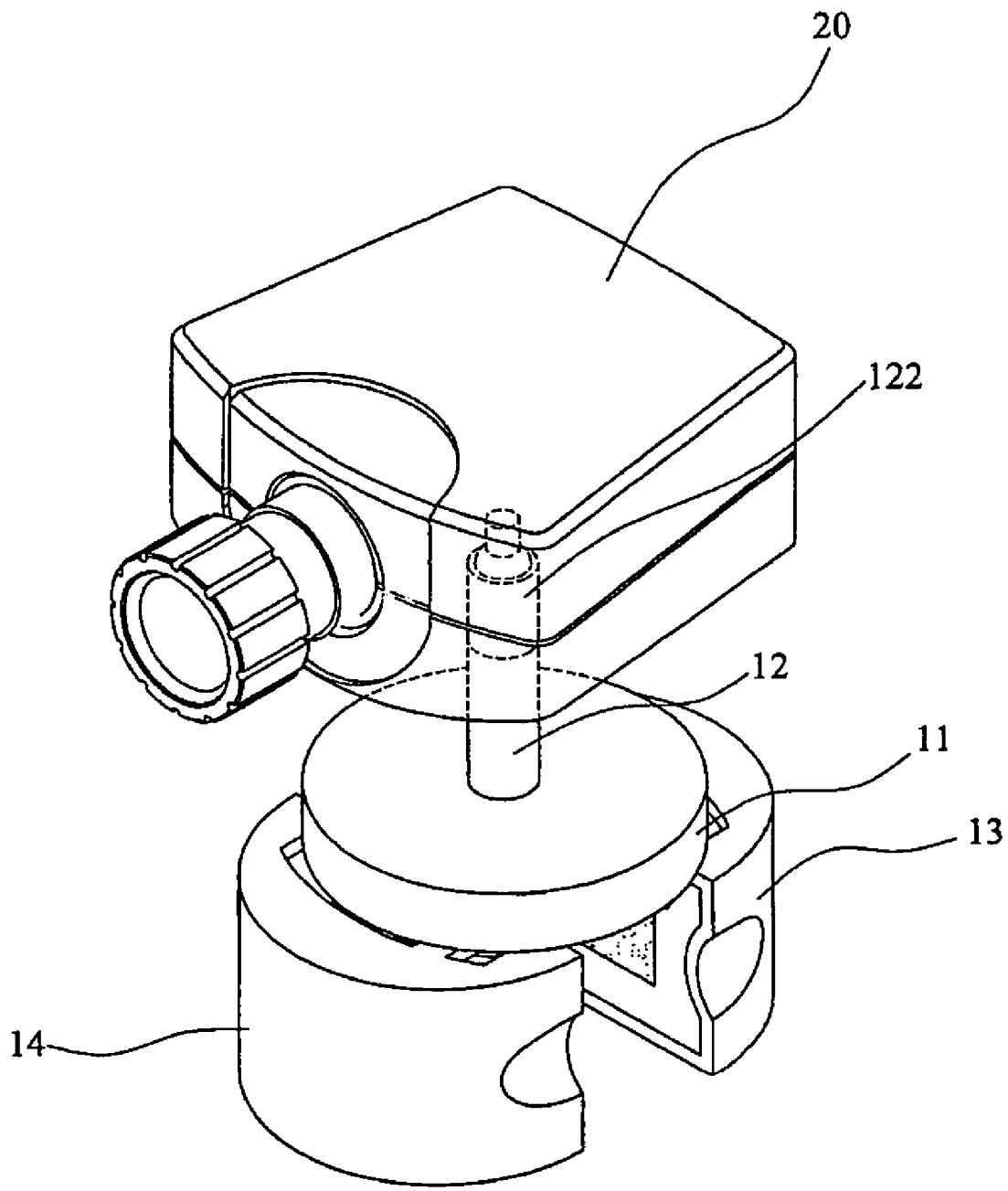
FIG. 6A is a perspective view of the support of FIG. 1 shown in use with a web cam in a clamping position.
Figure 6B:
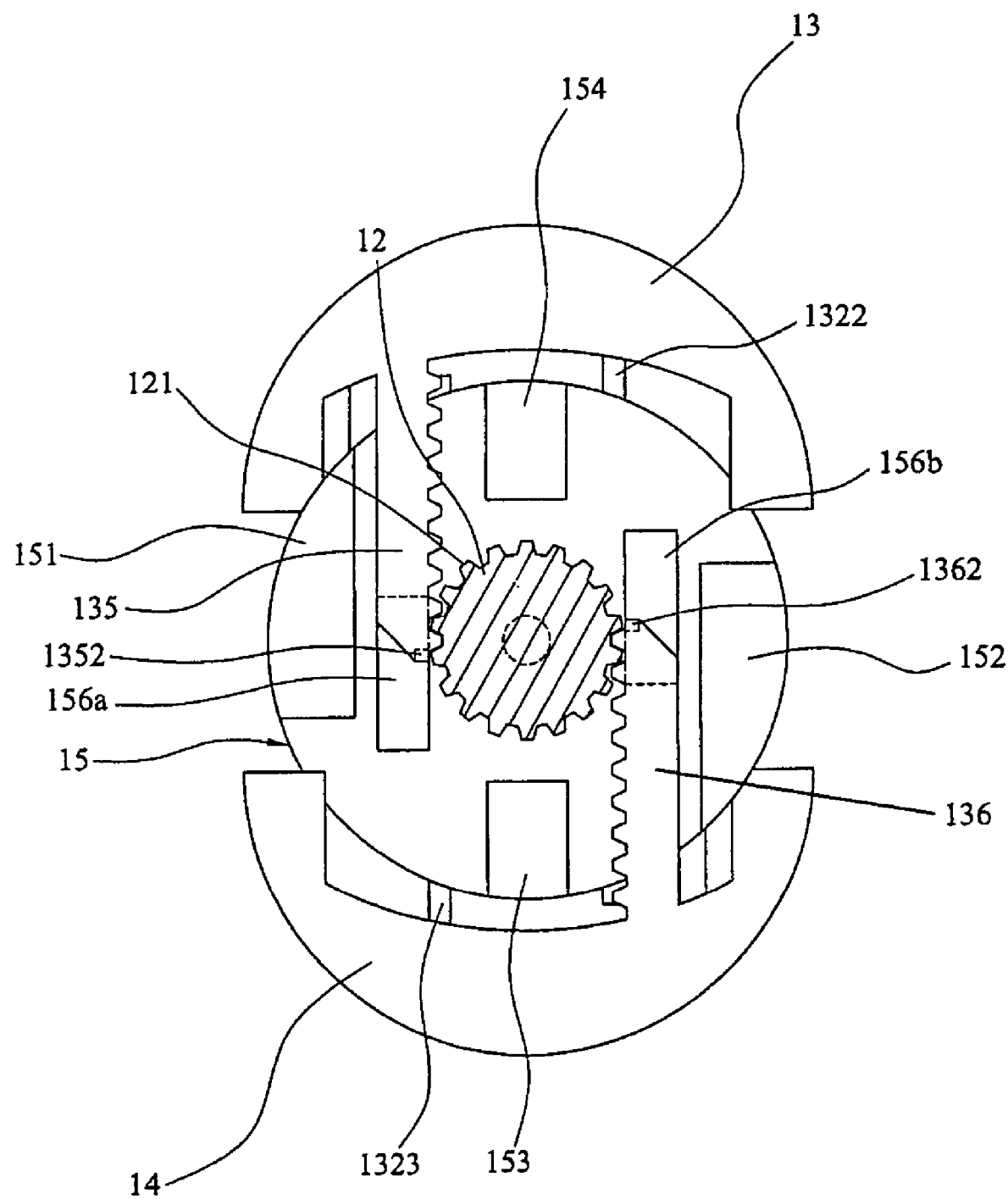
FIG. 6B is a simplified top plan view of the support when in the position shown in FIG. 6A.

Referring now to FIGS. 6A and 6B, the base supports 13 and 14 can be separated to form a clamping position, where a clamping space is defined between the two base supports 13 and 14. In this clamping position, the wings 151 and 152 are still positioned on the top of the base supports 13 and 14, while the wings 153 and 154 are separated from the top of the base supports 13 and 14. The extensions 135 and 136 still engage the gear wheel 121 at each side of the gear wheel 121.

The rotation of the post 12 can force the gear wheel 121 to separate the base supports 13 and 14 from each other to obtain a desired width therebetween, in which the increased friction between the pads 1321 and the bottom plate 15 will reinforce the clamping effect and the friction caused by legs 13 and 14. As the post 12 rotates and the extensions 135 and 136 travel along the gear wheel 121, the hooks 1352 and 1362 will move along the respective recesses 156a and 156b, and the ribs 157a and 157b will move along the respective grooves 1322 and 1323. As a result of the guided movements of the extensions 135, 136, the hooks 1352, 1362 and the ribs is 157a, 157b, the base supports 13 and 14 will remain fully attached to the bottom plate 15 yet be capable of experiencing relative movement along the bottom plate 15. In other words, the bottom plate 15 forms a platform upon which the base supports 13 and 14 can be moved with respect to each other.

Figure 7:
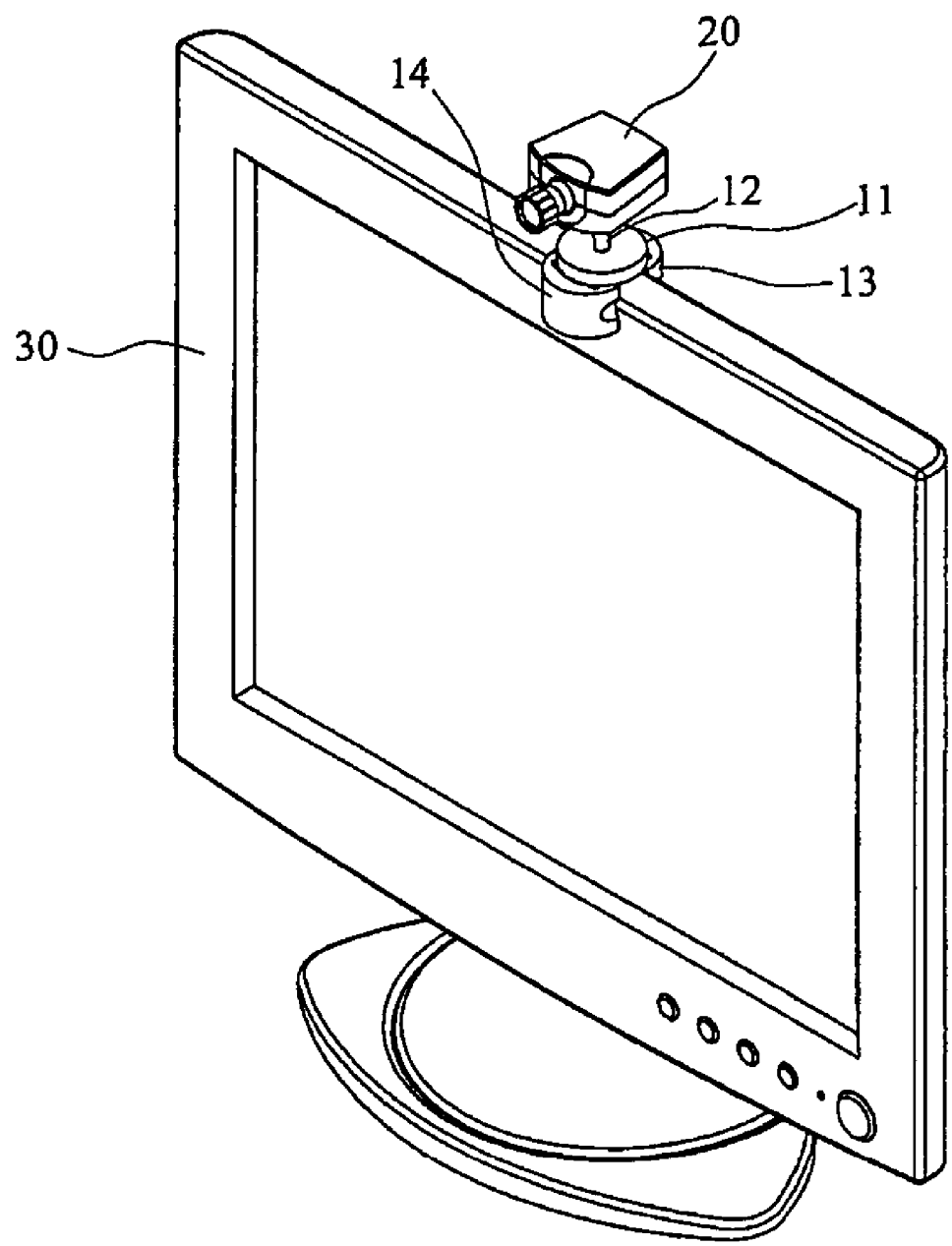
FIG. 7 is a perspective view of the support of FIG. 1 shown coupled to a web cam and clamped to a computer display.

As shown in FIG. 7, the post 12 can be rotated to force the gear wheel 121 to separate the base supports 13 and 14 to a desired width that is somewhat larger than the thickness of an LED display 30. Then, the user can rotate the post 12 in the opposite direction to reduce the desired width so as to tightly clamp the web cam 20 (from FIG. 6A) on to the LED display 30 through the protection of the pads 1311. The user can further adjust the ball joint 122 to set the web cam 20 to a desired angle position.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A combination of a computer peripheral device and a support for the computer peripheral device, the support comprising:
   a base;
   a post having a first end extending through the base and a second end that couples a computer peripheral device;
   a pair of base supports, each having an extension which is received within the base and which engages the first end of the post; and
   wherein the base supports are separated from each other to define a clamping space therebetween when the post is rotated.

2. The combination of claim 1, wherein the base defines a passage through which one of the extensions experiences reciprocal movement.

3. The combination of claim 1, further including a gear wheel carried on the first end of the post, and wherein each extension has a plurality of teeth for engaging the gear wheel.

4. The combination of claim 1, wherein one of the extensions has a hook, and wherein the base has a recess for receiving the hook.

5. The combination of claim 1, wherein the base has a bottom surface, with a rib provided on the bottom surface, and wherein one of the base supports has an upper surface which has a groove for receiving the rib.

6. The combination of claim 1, wherein the second end of the supporting post has a ball joint.

7. The combination of claim 1, wherein one of the base supports has an inner face, with a pad adhered on the inner face.

8. The combination of claim 5, further including a pad provided on the upper surface of one of the base supports.

9. The combination of claim 1, wherein the base supports assume a first position where they are positioned adjacent to, and contacting, each other, and a second position where they are separated to define the clamping space.

10. A combination of a computer peripheral device and a support for the computer peripheral device, the support comprising:
    a base having a first guide element carried thereon;
    a post having a first end extending through the base and a second end that couples a computer peripheral device, with a gear wheel carried on the first end of the post;
    a pair of base supports, each having an extension which is received within the base, each extension having a plurality of teeth for engaging the gear wheel;
    a second guide element that is associated with one of the base supports, and movably coupled to the first guide element; and
    wherein the pair of base supports assume a first position where they are positioned adjacent to, and contacting, each other, and a second position where they are separated to define the clamping space.

11. The combination of claim 10, wherein the base defines a passage through which one of the extensions experiences reciprocal movement.

12. The combination of claim 10, wherein the second guide element is a hook provided on one of the extensions, and wherein the first guide element is a recess that receives the hook.

13. The combination of claim 10, wherein the first guide element is a rib provided on a bottom surface of the base, and the second guide element is a groove provided on one of the base supports for receiving the rib.

14. The combination of claim 12, further including a rib provided on a bottom surface of the base, and a groove provided on one of the base supports for receiving the rib.

15. The combination of claim 10, wherein the second end of the supporting post has a ball joint.

16. The combination of claim 10, wherein one of the base supports has an inner face, with a pad provided adhered on the inner face.

17. The combination of claim 10, further including a pad provided on an upper surface of one of the base supports.

* * * * *